(12) United States Patent
Geier et al.

(10) Patent No.: US 7,061,425 B2
(45) Date of Patent: Jun. 13, 2006

(54) FREQUENCY ERROR TRACKING IN SATELLITE POSITIONING SYSTEM RECEIVERS

(75) Inventors: George J. Geier, Scottsdale, AZ (US);
Thomas M. King, Tempe, AZ (US);
Ravikiran Nory, Grayslake, IL (US);
Xiang Yuan, Chandler, AZ (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 10/986,697

(22) Filed: Nov. 12, 2004

(65) Prior Publication Data

US 2006/0103573 A1     May 18, 2006

(51) Int. Cl.
*G01S 1/00*     (2006.01)
*H04B 7/185*     (2006.01)

(52) U.S. Cl. ............................ 342/357.02; 342/357.12; 342/357.15

(58) Field of Classification Search ........... 342/357.02, 342/357.06, 357.15, 357.12; 701/213, 215
See application file for complete search history.

(56) References Cited

U.S. PATENT DOCUMENTS

| | | | |
|---|---|---|---|
| 5,343,209 A | 8/1994 | Sennott et al. | |
| 5,847,678 A * | 12/1998 | Tachita | 342/357.03 |
| 5,943,606 A * | 8/1999 | Kremm et al. | 455/12.1 |
| 6,081,228 A | 6/2000 | Leimer | |
| 6,313,789 B1 * | 11/2001 | Zhodzishsky et al. | 342/357.12 |
| 6,324,227 B1 | 11/2001 | Kang et al. | |
| 6,483,867 B1 | 11/2002 | Mannermaa | |
| 6,731,672 B1 * | 5/2004 | Eschenbach | 375/140 |
| 6,741,842 B1 * | 5/2004 | Goldberg et al. | 455/192.2 |
| 6,816,111 B1 * | 11/2004 | Krasner | 342/357.12 |
| 2003/0132878 A1 * | 7/2003 | Devereux et al. | 342/357.06 |
| 2003/0214432 A1 * | 11/2003 | Tawadrous et al. | 342/357.1 |
| 2004/0225439 A1 * | 11/2004 | Gronemeyer | 701/213 |
| 2005/0052317 A1 * | 3/2005 | McBurney et al. | 342/357.1 |

OTHER PUBLICATIONS

E.M. Copps, G.J. Geier, W.C. Fidler, P.A. Grundy, "Optimal Processing of GPS Signals", Navigation: Journal of the Institute of Navigation, vol. 27, No. 3, Fall 1980, 12 pages.

\* cited by examiner

*Primary Examiner*—Dao Phan
(74) *Attorney, Agent, or Firm*—Roland K. Bowler, II (57) ABSTRACT

A method in a satellite positioning system (SPS) receiver 100 including acquiring a plurality of at least two SPS signals, estimating frequency error for each of the plurality of SPS signals, and compensating for the frequency error of each of the plurality of SPS signal based on the estimated frequency errors for all of the plurality of SPS signals.

17 Claims, 5 Drawing Sheets

DATA BIT BOUNDARIES

FREQUENCY ERROR TRACKING IN SATELLITE POSITIONING SYSTEM RECEIVERS

FIELD OF THE DISCLOSURE

The present disclosure relates generally to satellite positioning system receivers, and more particularly to frequency tracking in satellite positioning system receivers, for example, in NAVSTAR Global Positioning System (GPS) receivers, and methods.

BACKGROUND

Conventional approaches to Global Positioning System (GPS) frequency tracking are based on independently tracking signals from corresponding satellites with fixed bandwidth loop architectures. Typically, a first or second order loop filter is used to separately estimate the Doppler frequency shift and perhaps the Doppler rate for each signal from a sequence of error detections performed for the corresponding satellite. While it is possible to adapt each loop filter to the environment of each satellite, each channel must track the GPS oscillator error rate.

U.S. Pat. No. 5,343,209 entitled "Navigation Receiver With Coupled Signal-Tracking Channels" to Sennott discloses a GPS navigation receiver with coupled-tracing channels that periodically estimates frequency, phase and the other characteristics of received carrier signals utilizing estimated parameter measurements for a plurality of the received signals combined in a statistically appropriate manner that takes into account line-of-sight paths, receiver clock dynamics, and other considerations. The method of Sennott uses a carrier phase parameter, which requires tracking carrier phase.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
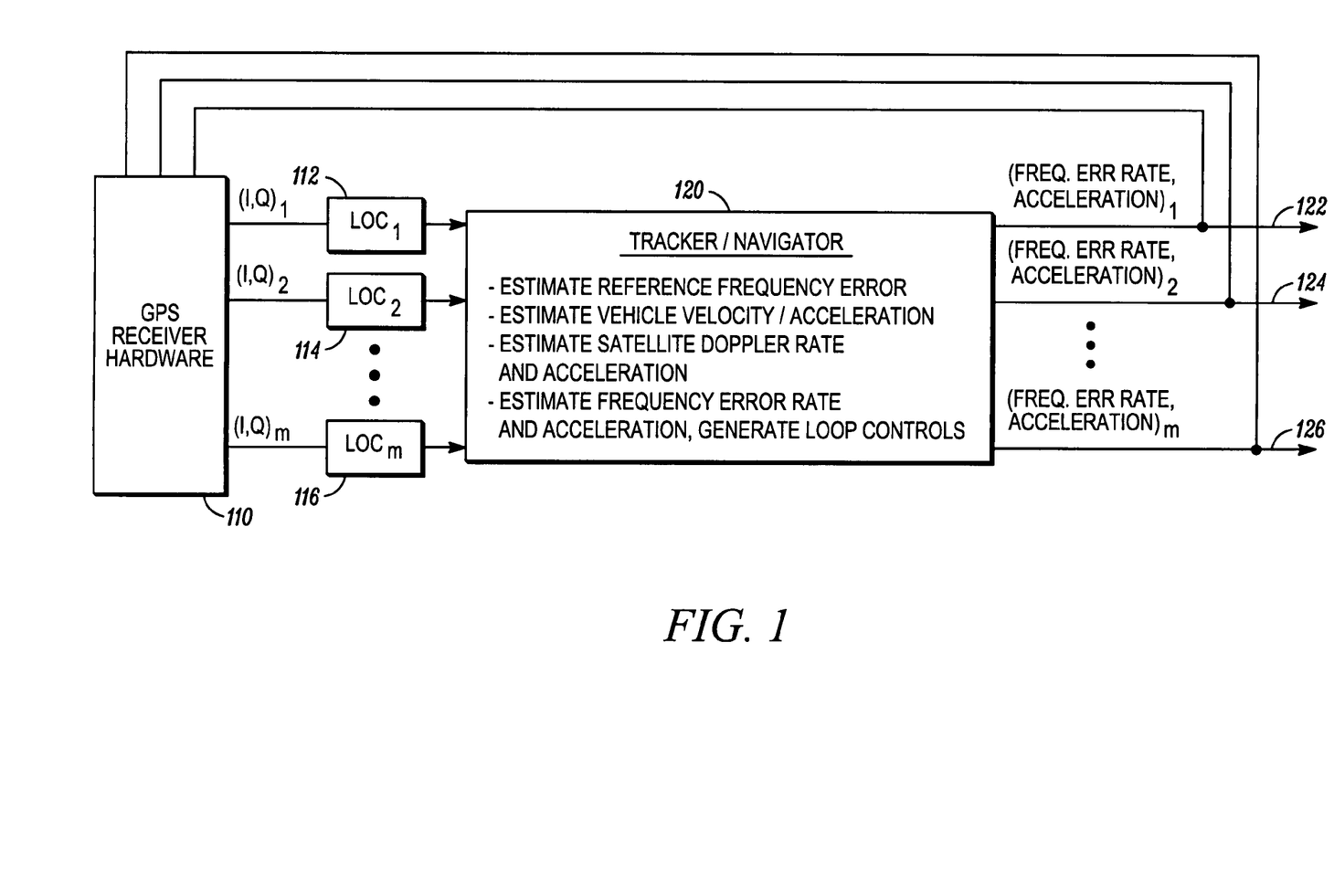
FIG. 1 illustrates an exemplary satellite positioning system receiver architecture schematic block diagram.

In FIG. 1, an exemplary satellite positioning system (SPS) receiver architecture 100 comprises a receiver and/or software at block 110 that filters, down-converts, digitizes and correlates received satellite signals. After correlation, the receiver block 110 outputs in-phase (I) and quadrature (Q) pairs at some rate dependent upon the architecture design for each satellite signal received. In one embodiment, each of the plurality of SPS satellite signals are correlated for multiple time periods, wherein each time period is less than a data bit period of the SPS signals. In one exemplary SPS application, the satellite I, Q signal pairs are generated every 10 ms, which is less than the 20 ms data bit period of the NAVSTAR SPS signals. Details for an exemplary block 110 are described more fully below in connection with FIG. 2.

Figure 3:
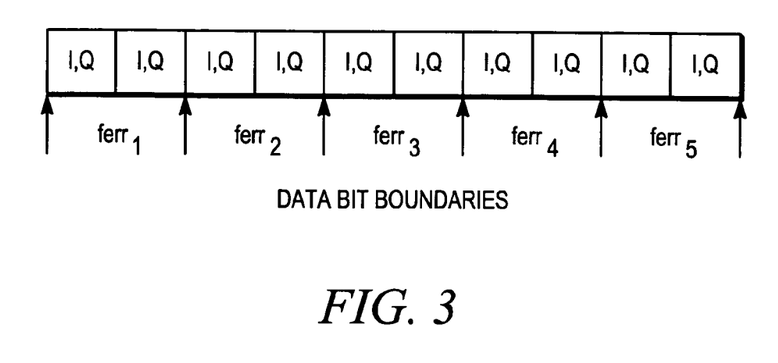
FIG. 3 illustrates an exemplary low overhead capture data structure output in a satellite positioning system receiver.

In FIG. 1, a plurality of multiple low overhead capture (LOC) modules 112, 114 . . . 116 is coupled to a corresponding one of the plurality of correlator outputs of the receiver block 110. The exemplary LOC modules each receive a corresponding set of quadrature I, Q signal pairs from the correlator. The corresponding I, Q signal pairs are concatenated over a time period greater than the rate at which the quadrature I, Q signal pairs are generated. In one exemplary embodiment, the quadrature I, Q signal pairs are concatenated over a time period of 100 ms, which is greater than the 20 ms data bit period of satellite signals. FIG. 3 illustrates data output from a LOC module output, wherein the exemplary output data structure is formed by the concatenation of ten quadrature I, Q signal pairs. In the exemplary embodiment, the correlator generates the quadrature I, Q signal pairs every 10 ms resulting in a data structure that has a length corresponding to 100 ms. In some embodiments, concatenation reduces the rate at which the tracker/navigator block 120 executes by an order of magnitude.

In FIG. 1, the output from the LOC modules is input to the Tracker/Navigator module 120. The primary function of module 120 is to maintain frequency track on the SPS satellites currently generating the LOC data in blocks 112 through 116 at relatively low signal strength and in the presence of unpredictable receiver accelerations and reference oscillator frequency instability. To achieve this goal, in one embodiment, the Tracker/Navigator mechanizes a Kalman filter, which is known generally in the art. Typically, the Kalman filter estimates receiver three-dimensional velocity, acceleration, reference oscillator frequency error and its rate of change. These estimated receiver parameters are referred to as filter "states". Thus, for this typical design which models velocity, acceleration, and clock frequency error and its rate of change as filter states, a total of eight states are used. The Kalman filter estimates these parameters using the frequency error estimates derived from the LOC data. These estimated parameters are referred to as "measurements" in the parlance of Kalman filtering. If the Kalman filter is designed with appropriate dynamic models for the interaction between states, and appropriate statistical models for the uncertainties associated with vehicle motion and measurement error, it will provide state estimates that are "optimal" in a minimum mean square error sense. Once optimal estimates are determined, estimates of frequency error rate and frequency error acceleration (labeled 122, 124 through 126 in FIG. 1) are derived from the Kalman filter states and the known orientation of the SPS satellites. The estimates of frequency error rate and frequency error acceleration are fed back to the receiver block 110, to keep the tracking loop dedicated to each satellite in lock.

In one embodiment, the tracker/navigator module 120 estimates the frequency error for each of the plurality of acquired satellite signals based on the data output from the LOC modules, for example, the data received by the module 120 from LOC modules 112, 114 . . . corresponding to satellites 1, 2 . . . m. In one embodiment, estimating the frequency error for each of the plurality of satellite signals includes estimating frequency error components for corresponding contiguous correlation data segments of each satellite signal and combining the frequency error components for the signal. A typical segment of LOC data for an individual satellite is illustrated in FIG. 3, wherein I, Q data are collected for ten 10 msec periods, and the collection is synchronized to the known navigation data bit edges (occurring every 20 msecs in GPS, as illustrated in FIG. 3) for each satellite. Synchronization is generally required in applications where extraction of frequency error from I, Q signal pairs is performed within the satellite signal data bit edges. Using methods which are known in the art, frequency error can be determined from each pair of 10 msec I, Q data within a navigation data bit boundary. Thus, for the LOC data collected in FIG. 3, five separate frequency error estimates can be determined, labeled $ferr_1$, $ferr_2$ ... $ferr_5$. These individual frequency errors can then be combined to produce a more accurate frequency error estimate that can be processed by the Tracker/Navigator block 120 at a lower rate (i.e., every 100 msecs for the exemplary illustration in FIG. 3). In one embodiment, the frequency error of the plurality of SPS signals is estimated based on an evaluation of the plurality of SPS signals over a time period greater than a data bit period of the SPS signals, for example, where the data output of the LOC modules is a concatenation of satellite signal I, Q components for a period greater than the satellite signal data bit period. The plurality of SPS signals are correlated for multiple time periods, each of which is less than the data bit period of the of SPS signals. The frequency error of each satellite signal is based on the multiple correlations of that satellite signal for a time period greater than a data bit period for that satellite. In some embodiments, the frequency error of the plurality of SPS signals is estimated based only on frequency information, without using tracking phase information.

In FIG. 1, the tracker navigation module 120 also compensates for the frequency error of each of the plurality of SPS satellite signals based on the estimated frequency errors for all of the plurality of SPS satellite signals. In FIG. 1, for example, the module 120 compensates for the frequency error of satellite signal 1 based on the estimated frequency errors for satellite signals 1, 2 ... m. This compensation is performed through the feeding back of frequency error rate information to the receiver block 110, as illustrated in 122 through 126 of FIG. 1.

Figure 2:
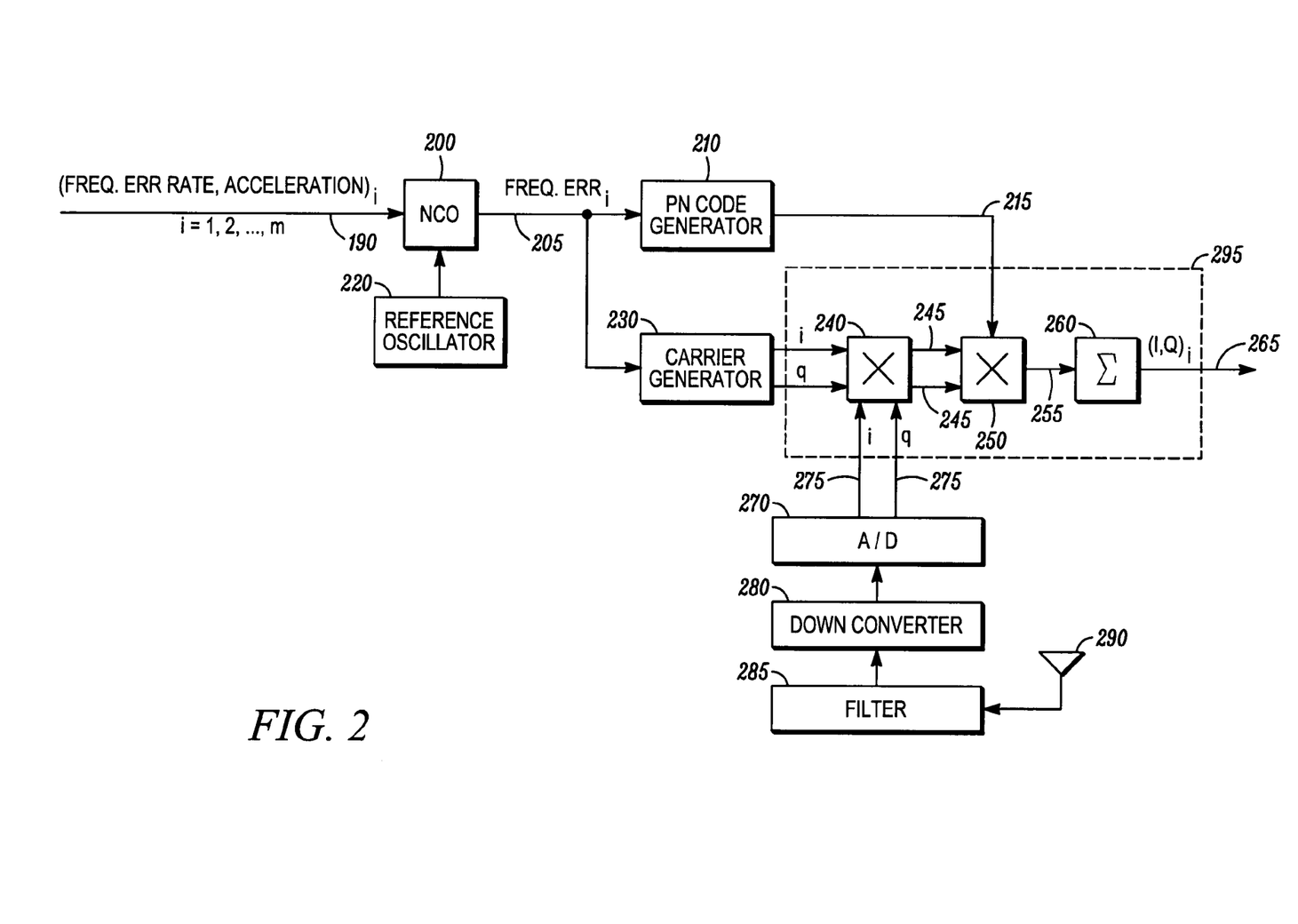
FIG. 2 illustrates a portion of an exemplary satellite positioning system receiver.

FIG. 2 illustrates an exemplary SPS receiver for processing data from a single satellite. As illustrated, the frequency error rate information 190 generated by the Tracker/Navigator for the $_i$th satellite is input to a Numerically Controlled Oscillator (NCO) 200. The NCO uses this information, together with nominal frequency information from the reference oscillator 220 to generate a frequency reference signal 205 for the $_i$th satellite. This reference frequency 205 is used to drive the Pseudo Noise (PN) code generator 210 for the $_i$th satellite. The PN code generation is required for the correlation process, i.e., in extracting the I, Q correlations for the $_i$th satellite (I, Q)$_i$ 265 from the sampled in-phase and quadrature correlation data (i, q) 275 output by the Analog to Digital converter (A/D) 270. The Radio Frequency (RF) energy output by the antenna 290, following filtering 285 and down conversion 280, contains signals from all the satellites in view of the receiver antenna 290. The information from an individual satellite can be extracted using the PN code 215. Replica in-phase and quadrature data is generated in the carrier generator block 230 using a frequency reference 205 output by the NCO 200. The generated carrier replica is then complex multiplied with the downcoverted in-phase and quadrature data 275 at block 240. Following this, the PN code 215 is superimposed on the signal representation following the complex multiplication 245 in block 250. The result 255 is then summed up to the sampling period of I, Q signal samples 265 at block 260, i.e., 10 msecs in the exemplary embodiment. The blocks 240, 250 and 260, taken together represent the correlator block 295 for the $_i$th satellite. The exemplary correlator block may be implemented as a bank of parallel correlators or as a single correlator that processes signals, virtually in parallel, at a higher rate than the rate at which the signals are received.

Figure 4:
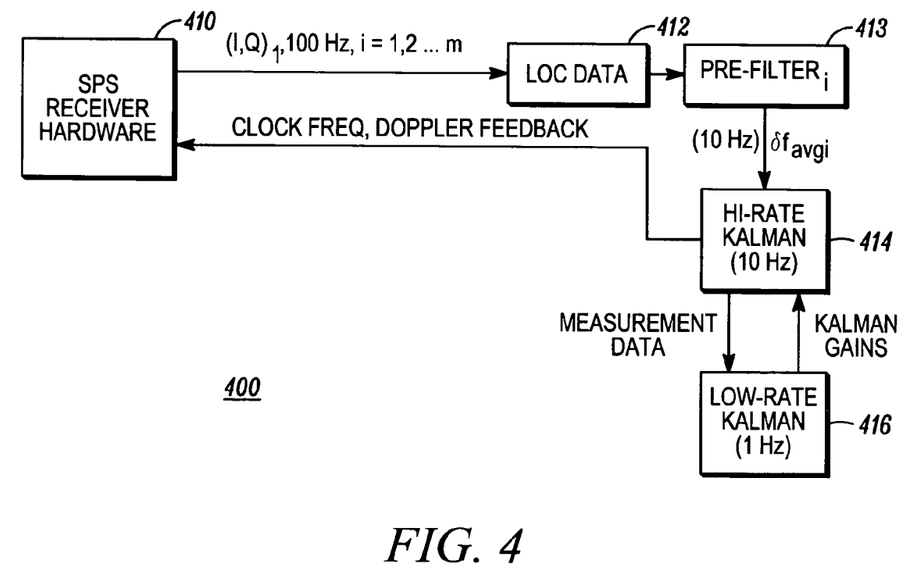
FIG. 4 is an exemplary Kalman filter based satellite positioning system receiver architecture schematic block diagram.

In one embodiment, a multi-rate Kalman filter is implemented in the navigation domain with states representing three orthogonal components of the host device, for example, velocity and acceleration, clock frequency error and its rate of change in an SPS receiver. In the Kalman architecture 400 of FIG. 4, frequency error measurements are presented to the Kalman filter by a pre-filter function 413, which combines the individual frequency error estimates derived from the LOC data 412. As referenced in FIG. 3, the sampled I, Q data output from the SPS receiver block is generated at a relatively high rate, e.g., 100 Hz. In FIG. 4, use of the LOC data 412 by the pre-filter 413 reduces noise by averaging the individual high rate samples, for example, a gain of roughly 3.5 dB is attained for a set of ten 10 msecs sets of I and Q. The use of the LOC data 412 by the pre-filter 413 also reduces the execution rate of the Kalman filter, for example, to 10 Hz. Further reductions of the Kalman filter processing burden can be achieved through partitioning the Kalman filter equations. In FIG. 4, the Kalman filter process is partitioned into relatively high rate foreground processing, for example, 10 Hz, and relatively low rate background processing, for example, 1 Hz.

The Kalman filter is comprised of two basic functions, a propagation step and an update step, with each step generally performed at the rate of execution of the Kalman filter as is known generally by those having ordinary skill in the art. The propagation step is comprised of state and covariance matrix propagation. The state has been defined for an exemplary embodiment of the Kalman filter to include SPS receiver velocity and acceleration components and oscillator frequency error and its rate of change, a total of eight states. The covariance matrix is then of dimension 8×8, comprised of 64 individual entities; its elements generally represent the uncertainties in the state estimates, i.e., the confidence of the Kalman filter in its estimates. The update is similarly comprised of a gain calculation from the propagated covariance matrix and the measurement model, a state update, and a covariance matrix update. Because covariance matrix operations are more costly computationally than operations on the state, it is advantageous to separate the two and perform the covariance matrix operations at a lower rate. This is the essence of the multi-rate embodiment of the Kalman filter, as illustrated by blocks 414 and 416 in FIG. 4. In the high-rate block 414, which runs at the highest rate at which the measurement data is available, the Kalman state is propagated and updated using the last set of gains computed by the low-rate Kalman 416.

The covariance matrix equations for propagation, gain calculation, and update are performed in the background at the lower rate. The Kalman filter computed gains are used to close the frequency tracking loops collectively at 10 Hz until a new set of gains are computed. The processing requirements inherent in the Kalman filter implementation are thus reduced. For the exemplary 8-state Kalman filter embodiment, this represents a savings in computations of roughly 80%.

In FIG. 4, the pre-filter 413, which operates on the LOC data using an averaged cross product frequency error detector to generate inputs to the Hi-Rate Kalman filter, was implemented in a Monte Carlo simulation to compare its performance with that of a conventional tracking loop design. The tracking threshold statistics summarized in Tables 1 and 2 below are based upon 500 Monte Carlo trials when all visible satellites signals are simulated at the specified C/No level. The host is stationary in the simulations, with an initial specified clock error of roughly 5 Hz. The "VFLL Stat" case corresponds to the VFLL design in its stationary mode. All tracking configurations make use of the same error detector, so the AFC thresholds are roughly 3 dB lower than previously established levels due to the averaging performed by the pre-filter.

TABLE 1

Summary of Thresholds for 8 Satellite Tracking

| $P_{LoL}$ | 0% | 1% | 5% |
|---|---|---|---|
| VFLL | 24 dB-Hz | 23 dB-Hz | 22 dB-Hz |
| VFLL Stat | 20 dB-Hz | 18 dB-Hz | 17 dB-Hz |
| AFC | 28 dB-Hz | 26 dB-Hz | 26 dB-Hz |

TABLE 2

Summary of Thresholds for 2 Satellite Tracking

| $P_{LoL}$ | 0% | 1% | 5% |
|---|---|---|---|
| VFLL | 27 dB-Hz | 26 dB-Hz | 26 dB-Hz |
| VFLL Stat | 24 dB-Hz | 23 dB-Hz | 22 dB-Hz |
| AFC | 28 dB-Hz | 26 dB-Hz | 26 dB-Hz |

Maximum benefit is gained in a stationary mode. Roughly 8–9 dB of improvement is realized relative to a conventional AFC tracking loop. This gain reduces to 3–4 dB when the stationary mode is turned off. As the number of visible satellites is reduced to two, the gains are reduced to 3–4 dB and 0–1 dB, respectively.

An interesting feature of the Vector Frequency Locked Loop (VFLL) Kalman filter is its adaptivity. As suggested, it is desirable to reduce tracking thresholds, i.e., to enable tracking of weaker SPS signals, and so therefore improve fix availability in weak signal environments. In a non-dynamic environment, this is performed by reducing gains in the Kalman filter embodiment, or by reducing the tracking loop bandwidth in an alternate embodiment. For both embodiments, the effect is to reduce the dynamic tolerance of the tracking loops, i.e., to make it more likely that a loop will lose lock if the SPS receiver accelerates or its oscillator frequency becomes unstable. To avoid this, both designs must detect acceleration and/or frequency instability. In the Kalman filter embodiment, this condition is detected by comparing residual information, i.e., the difference between a measure of the average frequency error from a satellite with its value predicted by the Kalman filter, with its predicted variance from the Kalman filter. A statistically significant difference between the residual mean and the residual variance predicted by the Kalman filter can be indicative of a change in the SPS receiver's environment, i.e., an acceleration or oscillator frequency shift. When such a condition is detected, the Kalman filter can increase the uncertainty associated with the acceleration and/or clock frequency error rate states, which results in the use of higher gains applied to the residuals computed by the Kalman filter for lower elevation satellites, i.e., those most likely to be affected by acceleration. For Kalman filtering, this uncertainty increase is achieved through addition of process noise to the filter's dynamic state. When the residual mean again becomes small relative to the residual variance predicted by the Kalman filter, the process noise levels can be decreased, thereby reducing the gains applied to the frequency error estimates derived for each satellite, and returning to the condition of reducing tracking thresholds as the acceleration or clock instability subsides. Eqns. (1–6) below illustrate logic for controlling adaptivity:

$$r^i_{stat}=(r_k/\sigma^2 resk) \quad (1)$$

$$r_{avg}=r^i_{stat} \quad (2)$$

$$\text{if } (|r_{avg}|>T^c_{max})\Delta q=q_{sfclk}q_{maxclk} \quad (3)$$

$$\text{if } (|r_{avg}|<T^c_{min})q=(1-\beta_{clk})q \quad (4)$$

$$\text{if } (|r_{stat}-r_{avg}|>T_{max})\Delta q=q_{sfacc}q_{maxa\ cc} \quad (5)$$

$$\text{if } (|r_{stat}-r_{avg}|<T_{min})q=(1-\beta_{acc})q \quad (6)$$

In Eqn. (1), the "i" index refers to a specific satellite's residual statistic, the index "k" refers to an individual high-rate, e.g., 10 Hz, sample, summed over the current second to produce the residual statistic, $r^i_{stat}$. The set of residuals, $r_k$, obtained with the current filter parameters, i.e., the current bandwidth, over the current interval, is used to adjust the parameters for the next interval. The average value, $r_{avg}$, of the satellite specific statistic, $r^i_{stat}$, summed over the current set of tracked satellites is used to control the process noise level for the clock frequency error and its rate of change, i.e., the dynamics associated with the "common mode". Eqns. (3–4). The difference between $r_{stat}$ and $r_{avg}$ controls the level of process noise for the acceleration states of the filter according to Eqns. (5–6). In Eqns. (3–4), the process noise increase is proportional, through $q_{sfclk}$, to the maximum rate of change of the clock frequency, as is the acceleration process noise, through $q_{sfacc}$, in Eqns. (5–6). In each case, the proportionality constant is determined by how quickly the clock or vehicle can attain its maximum acceleration. For example, a value of unity for $q_{sfacc}$ implies that the vehicle can reach maximum acceleration in one second. Thus, the process noise adaptation upwards can be relatively fast. To maintain conservatism, the process noise adaptation downwards is done slowly, and is controlled, for example, as an exponential decay, through the constants $\beta_{clk}$ and $\beta_{acc}$. In Eqns. (5–6), q, $\Delta$q and $q_{maxac}$ are three-dimensional vectors quantities corresponding to the three components of acceleration. The process noise increment is predisposed to the acceleration components in the horizontal plane. Adaptivity can also lead to determination of a stationary condition when velocity and acceleration estimates and their variances are sufficiently small and when minimum bandwidths are achieved.

Figure 5:
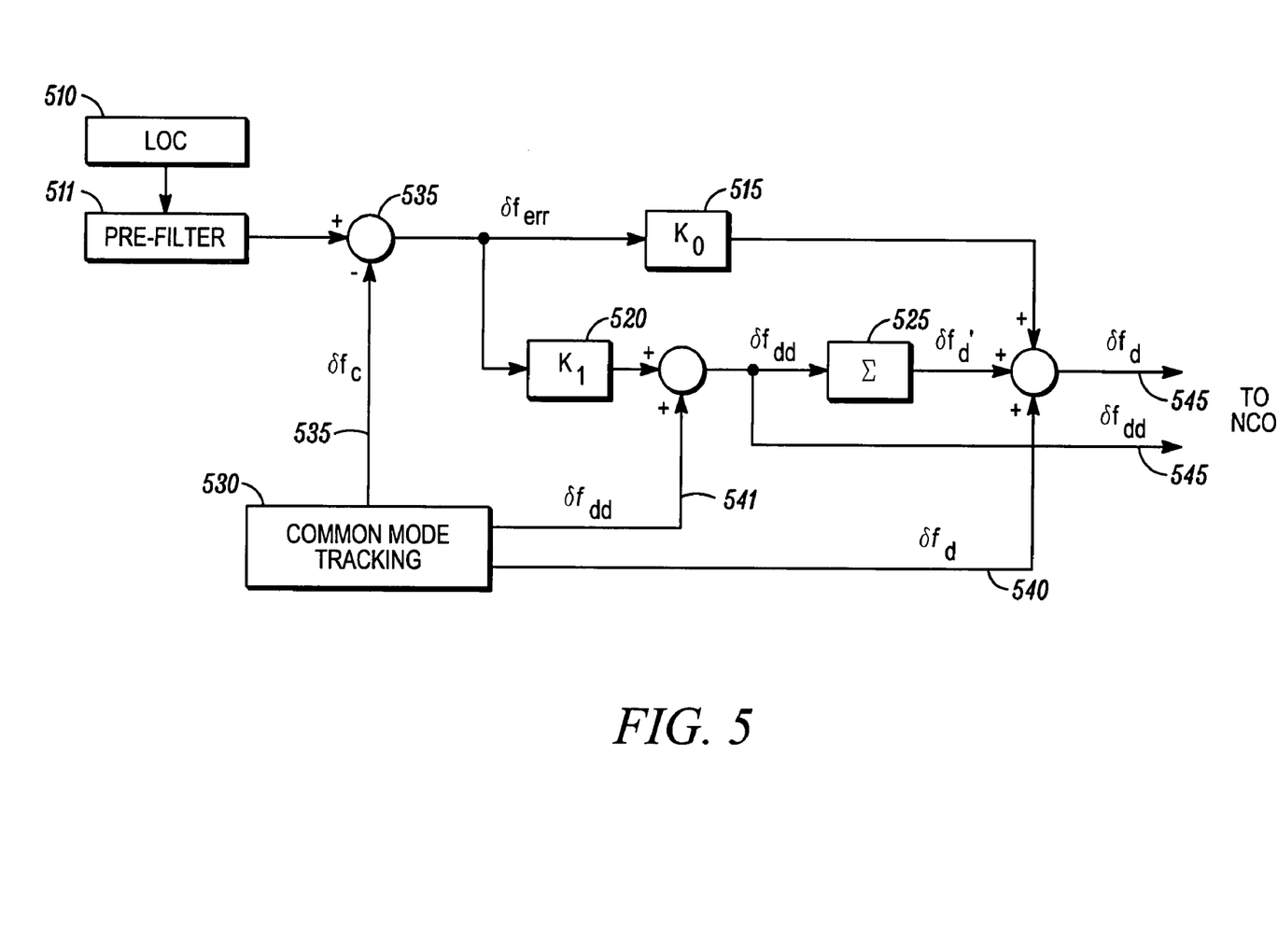
FIG. 5 is an alternative exemplary individual satellite tracking architecture schematic block diagram.
Figure 6:
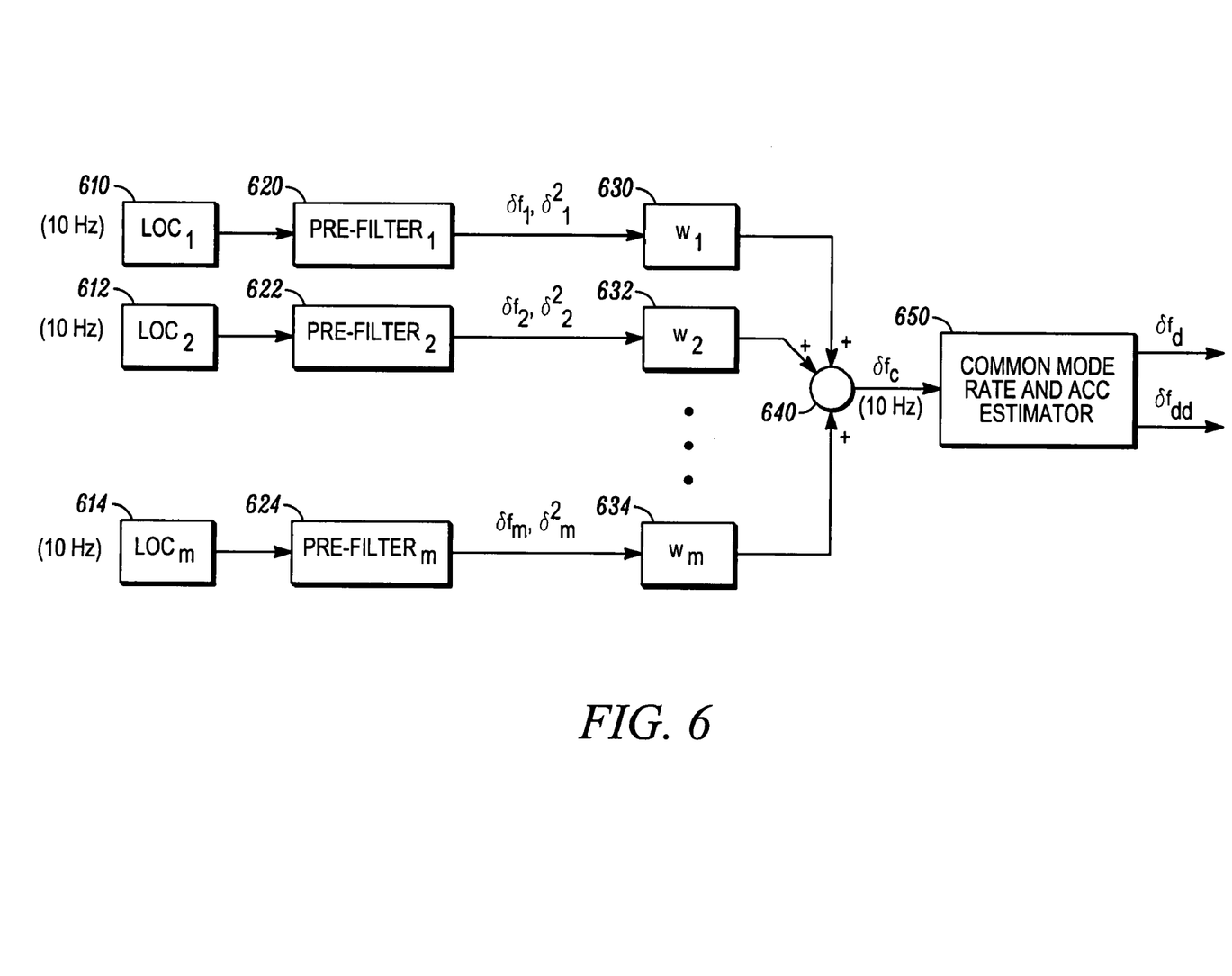
FIG. 6 is an alternative exemplary common mode tracking architecture schematic block diagram.

FIG. 5 illustrates an alternate embodiment without a Kalman filter, and FIG. 6 is a more detailed illustration of the common mode tracking function 530 in FIG. 5. Generating frequency tracking information for each of the plurality of SPS signals includes tracking bandwidth for each of the plurality of SPS signals. The bandwidth may be adjusted based on increasing the bandwidth towards a maximum value at a first rate and decreasing the bandwidth towards a minimum value at a second rate. Alternatively, generating the frequency tracking information for each of the plurality of SPS signals includes generating tracking gain for each of the plurality of SPS signals. The frequency for the plurality of SPS signals is tracked based on the frequency tracking information generated for the plurality of SPS signals.

In another embodiment, frequency error of any one or more of the plurality of SPS signals is compensated based on a reference frequency error of the SPS receiver. The reference frequency error of the SPS receiver may be determined based on the estimated frequency error of the plurality of satellite signals, for example, by averaging the estimated frequency error of the plurality of SPS signals. The estimated frequency error averages may be weighted equally or unequally. In one embodiment, the weighting of the estimated frequency error of the plurality of satellite signals is based on an elevation of the sources of the plurality of SPS signals. In another embodiment, the frequency error of each of the plurality of SPS signals may be compensated based on one of an estimated acceleration error of the SPS receiver, an estimated rate of change of a reference frequency of the SPS receiver, and an estimated velocity error of the SPS receiver.

In an alternative embodiment, tracking is partitioned into a common mode tracker portion that tracks clock frequency error and aids individual tracking loops dedicated to each satellite which track host dynamics. In FIG. 6, the common mode tracker could be driven by an average of the outputs of each pre-filter, 620, 622 . . . 624, which track the error detectors from each tracked satellite. The pre-filter output signals are weighted at 630, 632 . . . 634. In one embodiment, the weights are equal and fixed. The exemplary weighting neglects the possible (and undesirable) coupling of SPS receiver acceleration into the common mode tracker, and is largely avoided by an improved weighting scheme. In the exemplary weighting scheme, the weights, $w_i$, are inversely proportional to an error variance computed for each satellite. The error variance is calculated from a noise variance determined from the measured C/No, but includes a term which represents the potential for host acceleration along each satellite's Line Of Sight (LOS). This second term, as indicated below, is a function of the maximum expected velocity change in the horizontal plane and the satellite's elevation angle $E_i$. The maximum velocity change is computed from the maximum jerk level and the sampling period (0.1 sec). The second term effectively removes any impact of SPS receiver acceleration upon the common mode tracking function. In FIG. 5, the individual tracking loops can then track the dynamics of the SPS receiver, aided by the common mode error extraction.

$$w_i = (1/\sigma_i^2)/S \quad (7)$$

where:

$$S = \Sigma(1/\sigma_i^2) \quad (8)$$

$$\sigma_i^2 = \sigma_t^2 + \sigma_v^2 \cos^2 E_i \quad (9)$$

$$\sigma_v^2 = (j_{max} \tau^2/4)^2 \quad (10)$$

In FIG. 6, after weighting at 630, 632 . . . 634, a composite estimate of the oscillator frequency error is formed at summer 640. The composite frequency error estimate is input to an estimator block 650, which determines the rate of change of the composite estimated frequency error and acceleration 660. This information is used to aid the individual satellite tracking loops, as illustrated by FIG. 5 discussed further below.

FIG. 5 illustrates tracking of the line of sight (LOS) dynamics. Each satellite has its own tracking loop, and, except for the common mode aiding 540, is autonomous. The adaptivity is based upon a normalized average frequency error over a time interval, for example, one second, though this interval may be increased to improve performance. Generally, the bandwidth is decreased slowly in the absence of transient error and increased quickly in the presence of transient error, in a manner that ensures removal of the transient error by tracking. The bandwidth adaptivity is performed within a predetermined set of limits, denoted $B_{min}$ and $B_{max}$, tentatively set to 0.01 and (1.0 cosE+0.1 sinE)Hz, respectively, where E is the satellite's elevation angle. The gain $K_0$ at block 515 and the gain $K_1$ at block 520 for each loop are constrained to provide critical damping (i.e., with an equivalent continuous model damping factor of 0.707), but with their magnitudes increased or decreased together as the desired bandwidth increases and decreases.

In FIG. 5, a common mode frequency error component from the common mode tracking block 530 is removed at block 535 from the output of each satellite's LOC register 510 and pre-filter 511. This component of the frequency error is tracked by the aiding terms 540 and 541 also supplied from the common mode tracking block 530. The revised loop error signal output from the summer 535 is input to an otherwise conventional tracking loop, implemented through the gain blocks 515 and 520. The gains 515 and 520 are adapted by the adaptive bandwidth feature of the loop, which seeks to set the bandwidth to a relatively low level, subject to sensed accelerations. An input to the summing function 525 includes the common mode error acceleration term 541, and output of the summer 525 is combined with the common mode frequency error rate 540. The combination of the common mode aiding terms 540 and 541 and the outputs of the loop gains 515 and 520 then results in composite frequency error rate and acceleration terms 545 which drive a Numerically Controlled Oscillator (NCO) dedicated to tracking the corresponding satellite.

The bandwidth, B, of the loop in FIG. 5, which determines the loop gains 515 and 520, is adapted as a function of the recent history of the measured frequency error relative to the noise standard deviation in this alternate embodiment. In one embodiment, the last ten sensed frequency errors are averaged and normalized:

$$\delta f_{stat} = 0.1(\Sigma \delta f_{err})^2/(\Sigma \sigma_{nk}^2) \quad (11)$$

The variances in the above equation include noise variances output by the pre-filter, and so do not include the possible effects of acceleration, just what the statistic above is designed to detect. Thresholds for deciding when the bandwidth can be reduced and increased are designated: $T_{dec}$ & $T_{inc}$. The approach to increasing or decreasing $$\text{if } (\delta f_{stat} < T_{dec}) \text{ and } (B > B_{min}), \text{ decrease } B \quad (12)$$

$$\text{if } (\delta f_{stat} > T_{inc}) \text{ and } (B < B_{max}), \text{ increase } B \quad (13)$$

the bandwidth will generally be to decrease slowly, but increase quickly. Since most substantial maneuvers, for example, those in an automobile, take several seconds, the following approach may be considered for bandwidth lowering, corresponding roughly to a five second time constant T:

$$B_{new} = e^{-1/\tau}(B_{old} - B_{min}) + B_{min} = 0.75(B_{old} - B_{min}) + B_{min} \quad (14)$$

For increasing the bandwidth, a linear increase is postulated, with the slope proportional to the magnitude of the frequency error statistic:

$$B_{new} = S_{\delta f}(B_{max} - B_{old}) + B_{old} \quad (15)$$

where $$S_{\delta f} = \delta f_{stat}/\delta f_{statmax} \quad (16)$$

$$\text{if } (S_{\delta f} > 1) S_{\delta f} = 1. \quad (17)$$

This alternate implementation just described does not require a Kalman filter, and so does not depend on a detailed model for the SPS oscillator's frequency error behavior, enabling application in many platforms without additional adjustment and tuning.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a satellite positioning system (SPS) receiver, the method comprising:
   acquiring a plurality of at least two SPS signals;
   estimating frequency error for each of the plurality of SPS signals;
   compensating for the frequency error of each of the plurality of SPS signals based on the estimated frequency errors for all of the plurality of SPS signals.

2. The method of claim 1, estimating the frequency error of the plurality of SPS signals based on an evaluation of the plurality of SPS signals over a time period greater than a data bit period of the SPS signals.

3. The method of claim 1, estimating the frequency error of the plurality of SPS signals based only on frequency information.

4. The method of claim 1, estimating the frequency error of the plurality of SPS signals based only on frequency information, without tracking phase information, obtained from each of the plurality of SPS signals for a time period greater than a data bit period of the SPS signals.

5. The method of claim 1,
   correlating each of the plurality of SPS signals for multiple time periods, each of the time periods less than a data bit period of the of SPS signals,
   estimating the frequency error of each of the plurality of SPS signals based on the multiple correlations of each of the plurality of SPS signals for a time period greater than a data bit period of the plurality of SPS signals.

6. A method in a satellite positioning system (SPS) receiver, the method comprising:
   acquiring a plurality of at least two SPS signals;
   estimating frequency error for each of the plurality of SPS signals;
   compensating for any frequency error of each of the plurality of SPS signals based on a reference frequency error of the SPS receiver,
   the reference frequency error of the SPS receiver based on the estimated frequency errors of the plurality of SPS signals.

7. The method of claim 6, determining the reference frequency error of the SPS receiver based on a weighting of the estimated frequency errors of the plurality of SPS signals.

8. The method of claim 6, determining the reference frequency error of the SPS receiver based on a weighting of the estimated frequency errors of the plurality of SPS signals, wherein the weighting of the estimated frequency errors of the plurality of SIPS signals is based on an elevation of the sources of the plurality of SPS signals.

9. The method of claim 6, compensating for frequency error of each of the plurality of SPS signals based on one of an estimated acceleration error of the SPS receiver, an estimated rate of change of a reference frequency of the SPS receiver, and an estimated velocity error of the SPS receiver.

10. A method in a satellite positioning system (SPS) receiver, the method comprising:
    estimating frequency error for a plurality of at least two SPS signals at a first rate;
    generating frequency tracking information for each of the plurality SPS signals at a second rate;
    compensating for the estimated frequency error of each of the plurality of SPS signals based on the frequency tracking information generated at the second rate.

11. The method of claim 10, generating the frequency tracking information for each of the plurality of SPS signals at the second rate less than the first rate.

12. The method of claim 10, generating the frequency tracking information for each of the plurality of SPS signals includes one of generating a tracking bandwidth for each of the plurality of SPS signals, generating tracking gain for each of the plurality of SPS signals.

13. A method in a satellite positioning system (SPS) receiver, the method comprising:
    detecting a change in a condition monitored by the SPS receiver;
    generating frequency tracking information for a plurality of SPS signals based on the detected change in the condition monitored;
    tracking frequency for the plurality of SPS signals based on frequency tracking information generated for the plurality of SPS signals.

14. The method of claim 13, detecting the change in the condition based on a change in magnitude between frequency measurements for the plurality of SPS signals and estimated frequencies values for the plurality of SPS signals.

15. The method of claim 13, wherein generating the frequency tracking information for each of the plurality of SPS signals includes one of tracking bandwidth for each of the plurality of SPS signals, and generating tracking gain for each of the plurality of SPS signals.

16. The method of claim 13, wherein generating the frequency tracking information for each of the plurality of SPS signals includes tracking bandwidth for each of the plurality of SPS signals.

17. The method of claim 15, tracking the bandwidth based on increasing the bandwidth towards a maximum value at a first rate and decreasing the bandwidth towards a minimum value at a second rate.

* * * * *